Patented Dec. 18, 1928.

1,695,742

UNITED STATES PATENT OFFICE.

FRANCIS G. RAWLING, OF MADISON, WISCONSIN.

PROCESS OF PRODUCING SODIUM ACETATE.

No Drawing. Application filed May 11, 1927. Serial No. 190,646.

This invention relates to a process of producing sodium acetate and pertains particularly to steps for obtaining sodium acetate as an incident to and as an improvement in the pulping of wood.

One of the features of the invention is the avoidance of undue acidity from acetic acid and the use of this material in producing acetates. Another feature is the beneficial prevention of the dissolving action of the acid on the existent lignin in the wood which is undergoing pulping treatment.

When wood is subjected to temperatures in excess of 110° C. in contact with an aqueous solution of sodium sulphite, as result of the present invention, it is now discovered that considerable quantities of acetic acid are removed from the wood, together with other organic compounds of undetermined nature, which may be converted into acetic acid or acetates by further treatment. In the case of aspen, chestnut and gum the removal of acetic acid from the wood occurs rapidly between temperatures of 115° C. and 120° C. Providing that the temperature is not allowed to rise above 160° C., during the treatment of the wood with the sodium sulphite solution, not more than one third of the lignin is removed from the wood and none of the cellulose. The acetic acid formed during the treatment of the wood tends to produce acidity in the treating solutions, which is not desirable, since under conditions of acidity, both lignin and cellulose are dissolved from the wood. Under these conditions, the proportion of organic material to acetic acid in the treating solutions is increased, rendering the isolation of the acetates more difficult. In order to restrain this undesirable acidity, by the present invention, it is preferred to use a combination of sodium sulphite and the sodium salts of one or more weakly ionized polybasic acids, such as for instance sodium bicarbonate, sodium carbonate or sodium borate in a substantially neutral aqueous solution, the $P_H$ value of which solution lies between 11 and 5, for the purpose of treating the wood. This excludes sodium sulphide which is not suitable because it acts to dissolve lignin. In this manner, the acids are neutralized as rapidly as they are formed. These salts on the other hand are not strongly alkaline like caustic soda or sodium sulphide and do not dissolve lignin to an appreciable extent when present in solution with sodium sulphite, provided they are not used to excess. This is in contrast to known processes for the preparation of sodium acetate from sulphate waste liquors in which latter processes the waste liquors are treated with lime and soda and the processes are difficult to conduct on account of the large amount of lignin dissolved in the waste liquors.

In accordance with the process of the present invention, the procedure is conducted preferably by treating wood in the form of small pieces or shredded, with an aqueous solution of sodium sulphite and sodium bicarbonate at temperatures above 110° C. and below 160° C. for a period of from one to four hours, at the end of which time practically all the acetic acid will have been set free from the original wood compounds. At the end of the treating period the aqueous solution is separated from the residual wood fibre.

The solution contains sodium sulphite, sodium bicarbonate, sodium acetate and a number of compounds of unknown chemical structure, some of which are capable of being converted into sodium acetate by further treatment. This solution, however, contains only about one third of the lignin originally present in the wood, and none of the cellulose, and is in these particulars quite distinct from the residual liquors obtained from the well known "soda", "sulphate", and "sulphite" pulping processes, which contain practically all the lignin and nearly one fourth of the cellulose originally present in the wood. To bring about the conversion of the organic material in the solution to acetates, the solution is concentrated, either with or without the previous addition of caustic soda or lime. The concentrated liquor may be treated in the following manner, either directly or after the addition of a further amount of caustic soda. The concentrated liquid is mixed with from twenty to fifty per cent of its weight of lime, and the mixture is heated to a temperature between 200° C. and 280° C. More specifically, any one of the following procedures may be used:

1. The solution is separated from the wood residues, is evaporated to a specific gravity of 1.25 and is mixed with 10 per cent of its weight of caustic soda. The mixed liquid is incorporated with from 20 to 50 per cent of its weight of lime and the mixture is heated to a temperature between 200° and 280° C.

2. The solution is separated from the wood residues, is mixed with 5 per cent of its weight of caustic soda and is evaporated to a specific gravity of 1.25. The evaporated liquid is mixed with from 20 to 50 per cent of its weight of lime and the mixture is heated to temperatures between 200° and 280° C.

3. The solution is separated from the wood residues, is mixed with 10 per cent of its weight of lime, the lime residue is separated from the liquid and the latter is evaporated to a specific gravity of 1.25. The evaporated liquid is mixed with around 10 per cent of its weight of caustic soda, and subsequently with from 20 to 50 per cent of its weight of lime, and the resulting mixture is heated to temperatures between 200° and 280° C.

4. The solution is separated from the wood residues, is mixed with 10 per cent of its weight of lime, the lime residues are separated from the liquid and the latter is evaporated to a specific gravity of 1.25. The evaporated liquid is mixed with from 20 to 50 per cent of its weight of lime and the resulting mixture is heated to temperatures between 200° and 280° C.

Usually from two to four hours is sufficient to complete the conversion of part of the compounds present into sodium acetate. At the same time a part of the lime reacts with the residual sodium sulphite and organic sulphur compounds to form calcium sulphate and calcium sulphite, which are almost insoluble in water. The heated material is extracted with water and the solution thus obtained is concentrated so that sodium acetate may be crystallized from it. Previous to the crystallization of the sodium acetate, the solution may be treated with carbon dioxide under pressure to precipitate from solution the greater part of whatever sodium bicarbonate may be present and thus render the crystallization of the sodium acetate less difficult.

The initial addition of caustic soda or lime may be considered a causticizing treatment and the amounts added may be up to 30% of the weight of the solution to which it is added. The subsequent addition of lime is in amounts of from 20 to 50% of the weight of the solution. Under certain conditions the use of lime or soda prior to evaporation may be desirable because it facilitates evaporation as well as permitting some slight chemical reaction to proceed in the evaporator, and the resulting liquid is, of course, more completely mixed. The alternate or optional use of lime for soda or soda for lime may be desirable under certain conditions in the initial causticizing treatment and such substitution depends largely on the limitations of the apparatus in which evaporation is performed.

The specific gravity hereinbefore indicated is given merely for the purpose of the several examples. Specific gravity could be limited to between 1.15 and 1.35.

After the heating treatment at temperatures between 200° and 280° C., there are present the calcium and sodium salts of acetic, oxalic, sulphuric, sulphurous and carbonic acid and also an excess of lime and caustic soda. In the presence of moisture, water insoluble salts are formed, so that on lixiviation with water, the treated material resolves itself into two parts, calcium salts which are insoluble in water, such as calcium oxalate, carbonate, sulphate and hydroxide, and soluble sodium salts of the acids, the calcium salts of which are soluble in water, such as sodium acetate. Any calcium acetate which may be formed momentarily will react with caustic soda by double decomposition to form sodium acetate and nearly insoluble calcium hydroxide.

I claim:

1. The process of preparing sodium acetates from wood which process comprises treating liquor remaining after treatment of woody material with substantially neutral sodium containing extractive compounds by concentrating the liquor, adding caustic soda and lime, heating the resultant mixture and thereby producing water-soluble sodium acetate and relatively insoluble calcium salts, and separating the sodium acetate from the calcium materials.

2. The process of preparing sodium acetates from wood which process comprises treating liquor remaining after treatment of woody material with substantially neutral sodium - containing extractive compounds which include a soluble sulphite by adding caustic soda and lime and subsequently heating the mixture and thereby producing water-soluble sodium acetate and water insoluble calcium sulphate and calcium sulphite, adding water and thereby obtaining in solution the water-soluble sodium acetate, separating the solution from the insoluble materials, and crystallizing the sodium acetate of the solution.

3. The process of preparing sodium acetates from wood which process comprises treating liquor remaining after treatment of woody material with substantially neutral sodium - containing extractive compounds which include a soluble sulphite by adding caustic soda, and lime in amounts of at least twenty percent and not more than fifty percent, and subsequently heating the mixture and thereby producing water-soluble sodium acetate and water-insoluble calcium sulphate and calcium sulphite, adding water and thereby obtaining in solution the water-soluble sodium acetate, separating the solution from the insoluble materials, and crystallizing the sodium acetate of the solution.

4. The process of preparing sodium acetates from wood which process comprises treating liquor remaining after treatment of woody material with substantially neutral sodium-containing extractive compounds by concentrating the liquor, adding caustic soda and lime, heating the resultant mixture and thereby producing water-soluble sodium acetate and relatively insoluble calcium salts, subjecting the mixture to contact with carbon dioxide under pressure, and separating the sodium acetate from the calcium materials.

5. The process of preparing sodium acetates from wood which process comprises treating liquor remaining after treatment of woody material with substantially neutral sodium-containing extractive compounds which include a soluble sulphite by adding caustic soda and lime and subsequently heating the mixture and thereby producing water-soluble sodium acetate and water-insoluble calcium sulphate and calcium sulphite, adding water and thereby obtaining in solution the water-soluble sodium acetate, subjecting the mixture to contact with carbon dioxide under pressure, separating the solution from the insoluble materials, and crystallizing the sodium acetate of the solution.

6. The process of preparing sodium acetates from wood which process comprises treating liquor remaining after treatment by woody material with substantially neutral sodium-containing extractive compounds which include a soluble sulphite by adding caustic soda, and lime in amounts of at least twenty percent and not more than fifty percent, and subsequently heating the mixture and thereby producing water-soluble sodium acetate and water-insoluble calcium sulphate and calcium sulphite, adding water and thereby obtaining in solution the water-soluble sodium acetate, subjecting the mixture to contact with carbon dioxide under pressure, separating the solution from the insoluble materials, and crystallizing the sodium acetate of the solution.

7. The process of preparing sodium acetate from wood which process comprises treating wood with an aqueous solution of sodium sulphite and the sodium salt of a weakly ionized polybasic acid at temperatures above 110° C. and below 160° C., separating the chemical solution from the wood, concentrating the solution and incorporating therewith between 20 and 50 percent of its weight of lime, heating the mixture so obtained to temperatures between 200° C. and 280° C., treating the heated mixture with water to dissolve the soluble constituents therein, separating the insoluble content from the solution, and crystallizing the sodium acetate from this solution.

8. The process of preparing sodium acetate from wood, which process comprises treating wood with an aqueous solution of sodium sulphite and the sodium salt of a weakly ionized polybasic acid at temperatures above 110° C. and below 160° C., separating the chemical solution from the wood, adding caustic soda to the solution in amounts up to 30% by weight of the solution, concentrating the resulting mixture and incorporating therewith between 20 and 50 percent of its weight of lime, heating the mixture so obtained to temperatures between 200° C. and 280° C., treating the heated mixture with water to dissolve the soluble constituents therein, separating the insoluble content from the solution, and crystallizing the sodium acetate from the solution.

9. The process of preparing sodium acetate from wood, which process comprises treating wood with an aqueous solution of sodium sulphite and the sodium salt of a weakly ionized polybasic acid at temperatures above 110° C. and below 160° C., separating the chemical solution from the wood, concentrating the solution and incorporating therewith between 20 and 50 percent of its weight of lime, heating the mixture so obtained to temperatures between 200° C. and 280° C., treating the heated mixture with water to dissolve the soluble constituents therein, subsequently treating this solution with carbon dioxide under pressure, separating the precipitate, separating the insoluble content from the solution, and crystallizing the sodium acetate from the solution.

10. The process of preparing sodium acetate from wood which process comprises treating wood with an aqueous solution of sodium sulphite and the sodium salt of a weakly ionized polybasic acid at temperatures above 110° C., and below 160° C., separating the chemical solution from the wood, adding caustic soda to the solution in amounts up to 30% of the weight of the solution, concentrating the resulting mixture and incorporating therewith between 20 and 50% of its weight of lime, heating the mixture so obtained to temperatures between 200° C. and 280° C., treating the heated mixture with water to dissolve the soluble constituents therein, subsequently treating the solution with carbon dioxide under pressure, separating the precipitate from the solution, and crystallizing the sodium acetate from the solution.

11. The process of preparing sodium acetate from wood, which process comprises treating wood with an aqueous solution of sodium sulphite and the sodium salt of a weakly ionized polybasic acid at temperatures between 110° C. and 160° C., separating the chemical solution from the wood, concentrating the solution, adding thereto caustic soda up to 30 percent of the weight of the solution, and incorporating the resulting mixture with between 20 and 50% of its weight of lime, heating the mixture so obtained to temperatures between 200° C. and 280° C., treating the heated mixture with water to dissolve the soluble constituents therein, and crystallizing the sodium acetate from this solution.

12. The process of preparing sodium acetate from wood, which process comprises treating wood with an aqueous solution of sodium sulphite and the sodium salt of a weakly ionized polybasic acid at temperatures between 110° C. and 160° C., separating the chemical solution from the wood, concentrating the solution, adding thereto caustic soda up to 30% of the weight of the solution and incorporating the resulting mixture with between 20 and 50% of its weight of lime, heating the mixture so obtained to temperatures between 200° C. and 280° C., treating the heated mixture with water to dissolve the soluble constituents therein, subsequently treating the solution with carbon dioxide under pressure, separating the precipitate, and crystallizing the sodium acetate from the solution.

13. The process of preparing sodium acetate from wood, which process comprises treating wood with an aqueous solution of sodium sulphite and the sodium salt of a weakly ionized polybasic acid at temperatures between 110° C. and 160° C., separating the chemical solution from the wood, causticizing the solution by the addition of lime, separating the solution from the precipitate, concentrating the solution, incorporating therewith lime between 20 and 50% of its weight, heating the mixture to a temperature between 200° C. and 280° C., treating the heated mixture with water to dissolve the soluble constituents therein, and crystallizing the sodium acetate from this solution.

14. The process of preparing sodium acetate from wood, which process comprises treating wood with an aqueous solution of sodium sulphite and the sodium salt of a weakly ionized polybasic acid at temperatures between 110° C. and 160° C., separating the chemical solution from the wood, causticizing the solution by the addition of lime, separating the solution from the precipitate, concentrating the solution, adding caustic soda up to 30% of its weight and incorporating the mixture with from 20 to 50% of its weight of lime, heating the resulting mixture to temperatures between 200° C. and 280° C., treating the heated mixture with water to dissolve the soluble constituents therein, and crystallizing the sodium acetate from the solution.

15. The process of preparing sodium acetate from wood, which process comprises treating wood with an aqueous solution of sodium sulphite and the sodium salt of a weakly ionized polybasic acid at temperatures betwen 110° C. and 160° C., separating the chemical solution from the wood, causticizing the solution by the addition of lime, separating the solution from the precipitate, concentrating the solution, incorporating therewith lime between 20 and 50% of its weight, heating the mixture to temperatures between 200° C. and 280° C., treating the heated mixture with water to dissolve the soluble constituents therein, subsequently treating the solution with carbon dioxide under pressure, separating the precipitate therefrom, and crystallizing the sodium acetate from the solution.

16. The process of preparing sodium acetate from wood, which process comprises treating wood with an aqueous solution of sodium sulphite and the sodium salt of a weakly ionized polybasic acid at temperatures between 110° C. and 160° C., separating the chemical solution from the wood, causticizing the solution by the addition of lime, separating the solution from the precipitate, concentrating the solution, adding caustic soda up to 30% of its weight, incorporating the mixture with from 20 to 50% of its weight of lime, heating the resulting mixture to temperatures between 200° C. and 280° C., treating the heated mixture with water to dissolve the soluble constituents therein, subsequently treating the solution with carbon dioxide under pressure, separating the precipitate therefrom and crystallizing the sodium acetate from the solution.

In testimony whereof I affix my signature.

FRANCIS G. RAWLING.